United States Patent
Skinner et al.

(10) Patent No.: US 7,305,927 B2
(45) Date of Patent: *Dec. 11, 2007

(54) ASYMMETRICAL SAIL FABRIC

(75) Inventors: Duncan Skinner, Warren, RI (US); Guus Bierman, Breukelen (NL); Max de Bruin, Uithoorn (NL); Roeland Wentholt, Voorburg (NL)

(73) Assignee: Contender U.S., Inc., Fall River, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/470,317

(22) Filed: Sep. 6, 2006

(65) Prior Publication Data

US 2007/0022933 A1    Feb. 1, 2007

Related U.S. Application Data

(63) Continuation of application No. 10/922,237, filed on Aug. 19, 2004, now Pat. No. 7,104,210.

(60) Provisional application No. 60/496,338, filed on Aug. 19, 2003.

(51) Int. Cl.
*B63H 9/04* (2006.01)
(52) U.S. Cl. .................. 114/102.33; 428/113; 442/255
(58) Field of Classification Search ............ 114/102.1, 114/102.29, 102.3, 102.31, 102.33; 428/107, 428/109, 110, 113; 442/208, 255, 261, 286, 442/287, 288
See application file for complete search history.

(56) References Cited

U.S. PATENT DOCUMENTS

| | | | |
|---|---|---|---|
| 3,903,826 A | 9/1975 | Andersen | 114/103 |
| 4,444,822 A | 4/1984 | Doyle et al. | 428/109 |
| 4,499,842 A | 2/1985 | Mahr | 114/103 |
| 4,593,639 A | 6/1986 | Conrad | 114/103 |
| 4,679,519 A | 7/1987 | Linville | 114/103 |
| 4,708,080 A | 11/1987 | Conrad | 114/103 |
| 5,001,003 A | 3/1991 | Mahr | 428/247 |
| 5,097,784 A | 3/1992 | Baudet | 114/103 |
| 5,403,641 A | 4/1995 | Linville et al. | 428/113 |
| 5,470,632 A | 11/1995 | Meldner et al. | 428/110 |
| 6,112,689 A | 9/2000 | Baudet | 114/102.33 |
| 6,302,045 B1 | 10/2001 | Mahr | 114/102.33 |
| 6,311,633 B1 | 11/2001 | Keire | 114/102.33 |
| 6,332,420 B1 | 12/2001 | Rodgers | 114/102.31 |
| 7,104,210 B2 * | 9/2006 | Skinner et al. | 114/102.33 |

FOREIGN PATENT DOCUMENTS

DE    8707788    8/1987

OTHER PUBLICATIONS

International Searching Authority, International Search Report, dated Dec. 7, 2004.

* cited by examiner

*Primary Examiner*—Lars A. Olson
(74) *Attorney, Agent, or Firm*—Bromberg & Sunstein LLP

(57) ABSTRACT

A sailcloth in roll good form permits efficient and cost effective construction of cross cut and vertical cut, laminate sails based on "off-angle," (asymmetrical) load bearing fibers. The sailcloth also may include a conventional warp and fill thread or fiber layout. Such sailcloth illustratively is significantly less susceptible to load force stretch, creep elongation, and airfoil shape deformation because, among other things, it is not dependent on the load bearing limitations of symmetrical, woven or knitted roll good sailcloth.

20 Claims, 7 Drawing Sheets

90° fibers +
82° fibers +
70° fibers +

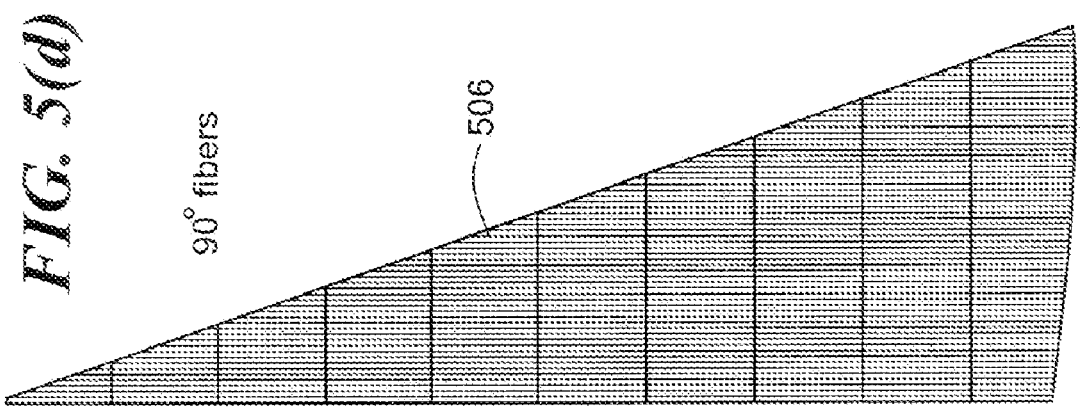
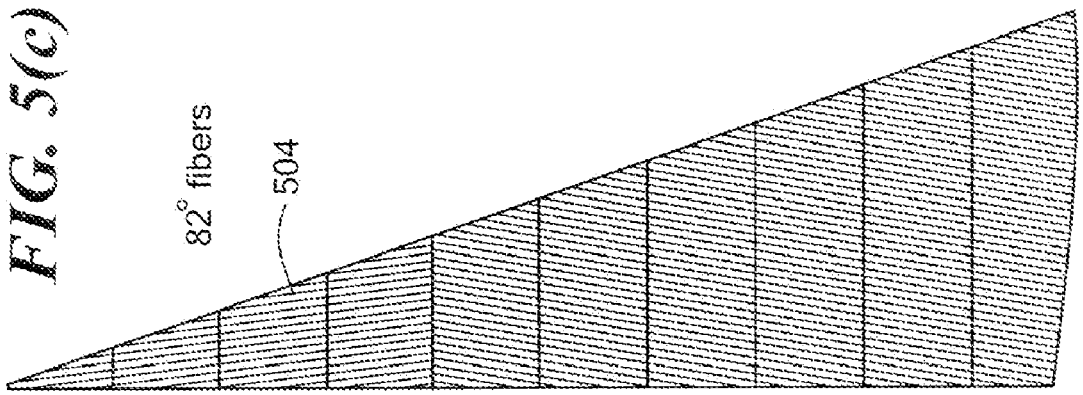

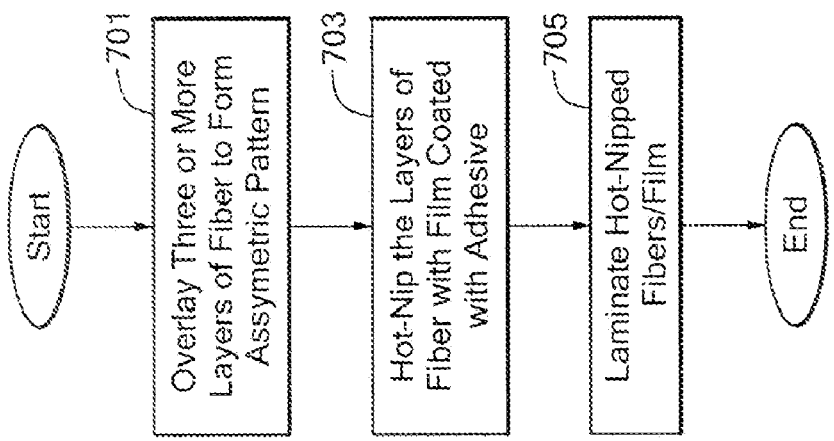
FIG. 7
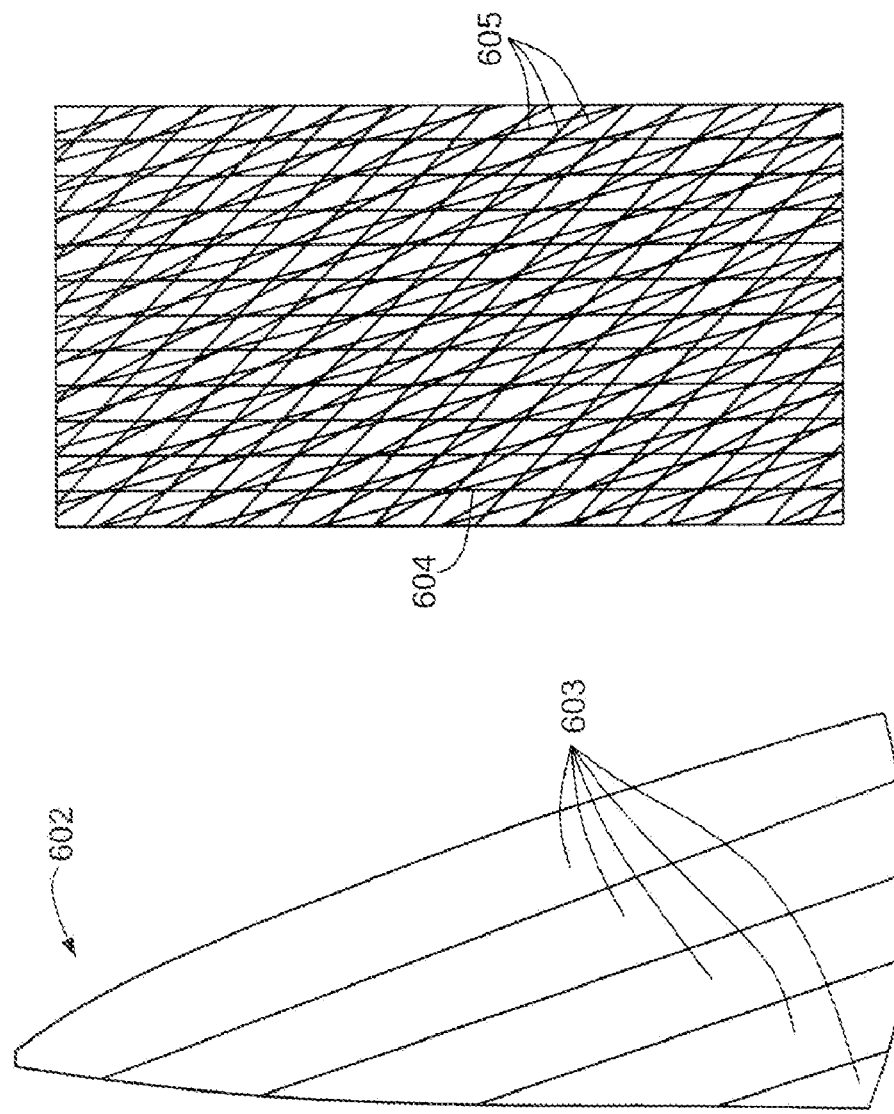
FIG. 6(b)
FIG. 6(a)

ASYMMETRICAL SAIL FABRIC

CROSS REFERENCE TO RELATED APPLICATIONS

This application is a continuation of U.S. application Ser. No. 10/922,237, entitled "Asymmetrical Sail Fabric," filed Aug. 19, 2004 now U.S. Pat. No. 7,104,210, which in turn claims priority from U.S. provisional patent application Ser. No. 60/496,338, entitled "Asymmetrical Sail Fabric," filed Aug. 19, 2003. Each of the above-described applications is hereby incorporated by reference, in its entirety.

FIELD OF THE INVENTION

The invention generally relates to sailcloth and, more particularly, the invention relates to roll good sailcloth.

BACKGROUND OF THE INVENTION

Maintenance of the airfoil shape of a sail is critical to its performance. Conventional woven, knit, or scrim sailcloth, whether of natural fibers or the latest polyester, nylon, aramid, PEN, PBO, ultra high molecular weight polyethylene (UHMWP), or carbon fiber, is prone to stretch, creep elongation, and airfoil shape deformation because of non-linear forces on the sailcloth under load, particularly when sailing upwind. When sailcloth is stretched and deformed, the airfoil shape of the sail is deformed, and the lifting capability of the airfoil is degraded. Since the mid 1970s, a number of load force advances have been made in the design of sails, in the use of different materials, and in methods of constructing sails, all intended to limit stretch, creep, elongation, and deformation of sailcloth and sails. These advances range from ever more tightly woven fabrics, development of more resilient fibers, alternative designs for sail panels, computer aided analysis of load forces, and computer aided design and manufacture of integrally interconnected sailcloth panels for individual sails, computer aided design of the direction of the thread or fiber layout of each panel of individual sails, and computer aided, three dimensional "molding" of individual sails.

Flat, or working sails, are those sails used to propel a sailing vessel as close as possible into the wind, tacking, or at wider angles across the wind, reaching. Sails in this category include mainsails, jibs, Genoas, and a variety of other sails that usually have at least one edge attached to a mast, boom, or wire running from a spar to the vessel. In this realm of working sails are two categories of sailcloth that can be defined as woven and laminated cloth.

Woven Sailcloth & Cross-Cut Panel Layouts

Woven sailcloth is typically made with continuous filament polyester, such as Dacron, on looms that permit very dense constructions. This style of cloth is created by an over-then-under intersection of warp (fibers running the length of the roll) and weft (fibers running across the width of the roll) yarns that are tightly packed together. By varying the size, or denier, of these fibers in conjunction with the fiber count in either direction, the stretch properties of the cloth may be altered to better suit a particular sail design. For example, by combining a relatively large weft yarn with a small warp yarn, all the crimp displacement can be allocated to the warp yarn, in effect, the loom is bending the warps around the weft fibers that are being held straight. The result is a low stretch fabric in the weft direction with the warp direction easier to stretch as the added length of crimp gets pulled out of the fiber with loading.

With the exception of some experiments using tri-axial weaves which were symmetrical about the warp and the 45° axis, conventional woven sailcloth has been based upon a symmetric warp—weft fiber orientation of 0° for the warp and 90° for the weft. These fabrics are most commonly arranged in cross-cut panel configurations to align the stronger weft fibers up the leech of the sail in the general direction of the loading out of the head and clew corners of the sail. For the loads not following this path, the stability of the woven cloth generated by the very tight weave and resin finish helps reduce off thread-line stretch and promotes recovery from any cloth elongation that does occur. While some woven sail fabrics are designed to be used in radial constructions, the vast majority of sails made from woven Dacron are designed with cross-cut panel layouts. Because the woven cloth is typically symmetrical about the warp axis or machine direction, the fabric can be rolled either way in the panel, leech to luff or luff to leach, and still maintain the desired alignment of the weft fibers to the loads. However, the symmetry of the woven cloth can also be inefficient, since various fibers in the cloth may not be aligned to a load.

An exemplary cross-cut sail 100 is illustrated in FIG. 1(a). The fabric layout in an exemplary panel 102 of the cross-cut sail is illustrated in FIG. 1(b). Cross-cut sail constructions can vary in some details but the general panel layout has the seams of the cloth running from the leech of the sail to the luff at an angle roughly perpendicular to a straight line from the clew to the head of the sail. In so doing, the weft threads 106, which are usually lower in stretch than the warp fibers 104 in a cross-cut panel, are aligned with the strongest loads in the sail. Cross-cut panels 102 are generally rectangular in shape with one edge cut at an angle where it affixes to the mast. The cross-cut panels 102 are joined along their long edges which are slightly curved by the sailmaker to provide the necessary 3-dimensional shaping in the finished sail to generate lift.

Because the panels are generally rectangular, they can be cut from rolls of woven fabric with relatively little wasted material. The full width of the cloth can be utilized and with careful nesting of the panels to align the short edges together, it is not uncommon to achieve fabric utilization of 90-95%, meaning, for example, the sailmaker will need to order 55 yards of fabric for a sail that will ultimately use 50 yards of material.

Laminated Sailcloth and Tri-Radial Layouts

In the early 1980's, higher modulus fibers like Kevlar were introduced to sailcloth manufacturers. With considerable more strength and lower stretch than polyester Dacron fibers, Kevlar was first trialed in high performance sails for the America's Cup. Prone to flex fatigue and having no shrinkage even with high temperatures, this new fiber did not lend itself to the traditional tightly woven constructions used with Dacron and further tightened up with shrinkage through heat-setting.

Rather, this new fiber was woven into more loosely designed constructions that were stabilized with the addition of a Mylar film. By laminating a sheet of 2 or 3 mil film to these Kevlar taffetas, the cloth manufacturers imparted enough stability to the weaves to resist the off-thread line loading and allow the sails to hold their designed shapes. Early trials were plagued with failures in lamination and actual cloth breakage but improvements in lamination techniques and a better understanding of fiber content to strength requirements has all but eliminated those problems.

Concurrent to the advent of laminated cloth was the development of the tri-radial panel construction, first used in sails for the America's Cup. An exemplary tri-radial sail 201 is shown in FIG. 2(*a*), while the fabric layout of an exemplary panel 202 is shown in FIG. 2(*b*). This construction technique allows the sailmaker to align the warp thread line 204 of the cloth in the general direction of the loads emanating out of the sail corners. Hand in hand with this trend, cloth suppliers started to make warp oriented laminates where the majority of the fabric's strength was in the warp tread 204 direction and not in the direction of the weft threads 206. Because laminators can keep a high rate or tension on the warp fibers during manufacture, the stretch resistance of the warp could be optimized to limit fabric elongation to levels not possible in woven cloth. This new construction technique combined with the use of high modulus fibers in warp oriented laminates resulted in a new level of performance in terms of strength to weight and shape retention.

However, tri-radial design and panel configurations increases the labor required to build a sail and the amount of cloth needed to make all the panels. Because radial panels 202, or gores, are generally triangular in shape, they are not as efficiently nested into the sail as is a cross-cut panel. Furthermore, to maintain thread lines in the gores, even with tight panel nesting, a higher percentage of sail fabric is wasted when compared to the cloth utilization with cross-cut panels. Average cloth utilization rates for common tri-radial panel designs are in the 80% range meaning a sailmaker will need to use almost 63 yards of fabric for the same sail that used 55 yards in the cross-cut design example. Compounding added expense of poor cloth utilization in the tri-radial design is the increased labor required for the assembly of the many more panels than needed for the same sail build as a cross-cut design.

For grand prix racing, where price is not a paramount concern to the sail maker or the sailor and where conventional roll good sailcloth is no longer widely used, some advances have been very successful. These include Peter G. Conrad's "airframe" patent, U.S. Pat. No. 4,593,639, and his "Genesis" patent, U.S. Pat. No. 4,708,080, which constructs a sail "without sailcloth"; and Jeanne-Pierre Baudet's molded said construction methods, U.S. Pat. No. 5,097,784, U.S. Pat. No. 6,112,689 (used in North Sails' highly regarded 3DL® sails). Other patents, such as Fred Aivars Keir's woven laminate patent, U.S. Pat. No. 6,311,633, may also advance grand prix sailmaking. However, the cost of fabrication and technology required for these advances is beyond the resources of most sail makers and similarly beyond the budgets of most amateur sailors, even serious recreational racing and offshore cruising sailors.

It therefore is desirable for a sailcloth to be both affordable and less susceptible to load force stretch creep elongation, and airfoil shape deformation.

SUMMARY OF THE INVENTION

In accordance with various embodiments of the invention, a sailcloth in roll good form permits efficient and cost effective construction of cross cut and vertical cut, laminate sails based on "off-angle," load bearing fibers. The sailcloth may also include a conventional warp and fill thread or fiber layout. Such sailcloth illustratively is significantly less susceptible to load force stretch, creep elongation, and airfoil shape deformation because, among other things, it is not dependent on the warp (0°) and fill (90°) load bearing limitations of conventionally woven, knitted, or formed scrim roll good sailcloth.

As noted above, this affordable sailcloth may be produced as roll good sailcloth in a broad variety of fabrics, and it can be used readily and efficiently by sail makers with existing design, cutting, and bonding technology to produce crosscut or vertical cut sails. Moreover, embodiments of this invention also eliminate the labor intensive, expensive, and wasteful methods and techniques of radial cut sail making, which have been devised as one common approach to load force design.

In accordance with various aspects of the invention, a sail cloth and a method of making a sail cloth in roll good form are presented. The sail cloth has a machine that runs the length of the sail cloth. The sail cloth includes at least three layers of fiber that are overlaid. Each layer of fiber is formed from a plurality of substantially parallel fibers generally oriented in a direction that is different than the fibers in any other layer. The layers of overlaid fiber form an asymmetric pattern across the machine axis.

In accordance with another aspect of the invention, a sail cloth and a method of making a sail cloth in roll good form is presented, the sail cloth having a first face and a second face. The sail cloth includes three or more non-woven overlaid layers of fiber. The layers of fiber include a first layer of fiber having fibers arrayed in parallel and oriented in a first direction. A second layer of fiber having fibers is arrayed in parallel and oriented in a second direction different from the first direction. A third layer of fiber having fibers is arrayed in parallel and oriented in a third direction different from the first direction and the second direction. The overlaid layers of fiber form a pattern that when viewed from the first face is different from when viewed from the second face.

In embodiments related to the above-describe embodiments, the at least three layers of fiber are non-woven. One of the at least three layers may have fibers oriented parallel or perpendicular to the machine axis. The at least three layers of fiber may be combined with one or more substrates to form the cloth. The at least three layers of fiber may be laminated together using, for example, a material chosen from the group of materials consisting of a polyester film and a taffeta. The at least three layers of fiber may be molded together using a mold material, such as a polymer.

In further embodiments related to the above-described embodiments, the at least three layers of fibers may vary or have equal denier and/or denier per inch. All the layers of fiber that form the sail cloth form, when overlaid, may form a pattern that lacks lack mirror image symmetry across the machine axis. The at least three layers of fiber may include four layers of fiber.

In still further embodiments related to the above-described embodiments, a sail is formed from the sail cloth. The sail may include a plurality of cross-cut panels, wherein at least one of the cross-cut panels includes the sail cloth. The sail may include a plurality of radial and/or vertical-cut panels, wherein at least one of the radial and/or vertical-cut panels includes the sail cloth. The sail may be a headsail, a mainsail, or a spinnaker. Each layer of fiber may be aligned along a predetermined load line on the sail during expected sailing conditions.

BRIEF DESCRIPTION OF THE DRAWINGS

The foregoing and advantages of the invention will be appreciated more fully from the following further description thereof with reference to the accompanying drawings wherein:

FIG. 5(b) schematically shows the 70 degree fibers of the sail of FIG. 5(a).

FIG. 5(c) schematically shows the 82 degree fibers of the sail of FIG. 5(a).

FIG. 5(d) schematically shows the 90 degree fibers of the sail of FIG. 5(a).

FIG. 6(a) schematically shows an exemplary leech or vertical-cut panel arrangement for a sail using roll good cloth, in accordance with an embodiment of the invention.

FIG. 6(b) schematically shows the layers of fiber within the roll good sail cloth of FIG. 3(a), in accordance with an embodiment of the invention.

FIG. 7 shows a process of making a roll-good sail cloth in accordance with an embodiment of the invention.

DESCRIPTION OF ILLUSTRATIVE EMBODIMENTS

Figure 1A:
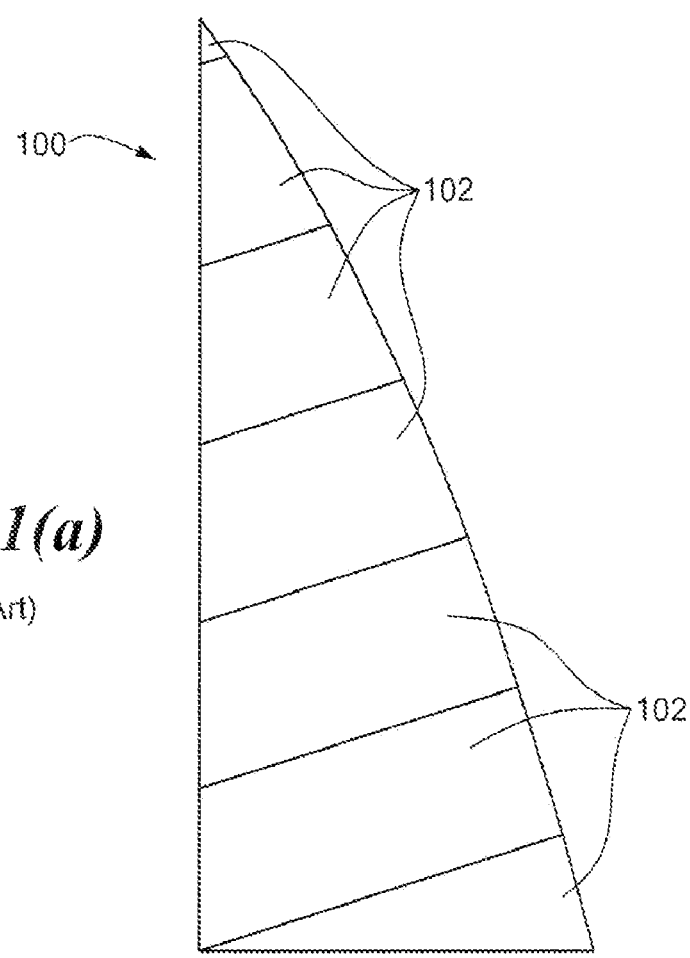
FIG. 1(*a*) schematically shows a cross-cut sail (prior art)
FIG. 1(b) schematically shows the woven layers of fiber within an exemplary panel of the cross-cut sail of FIG. 1(a).
Figure 1B:
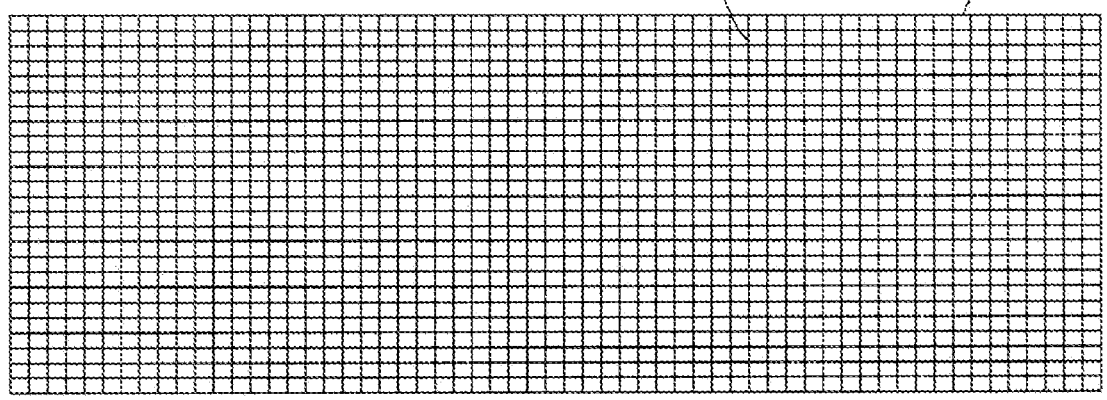
Figure 2A:
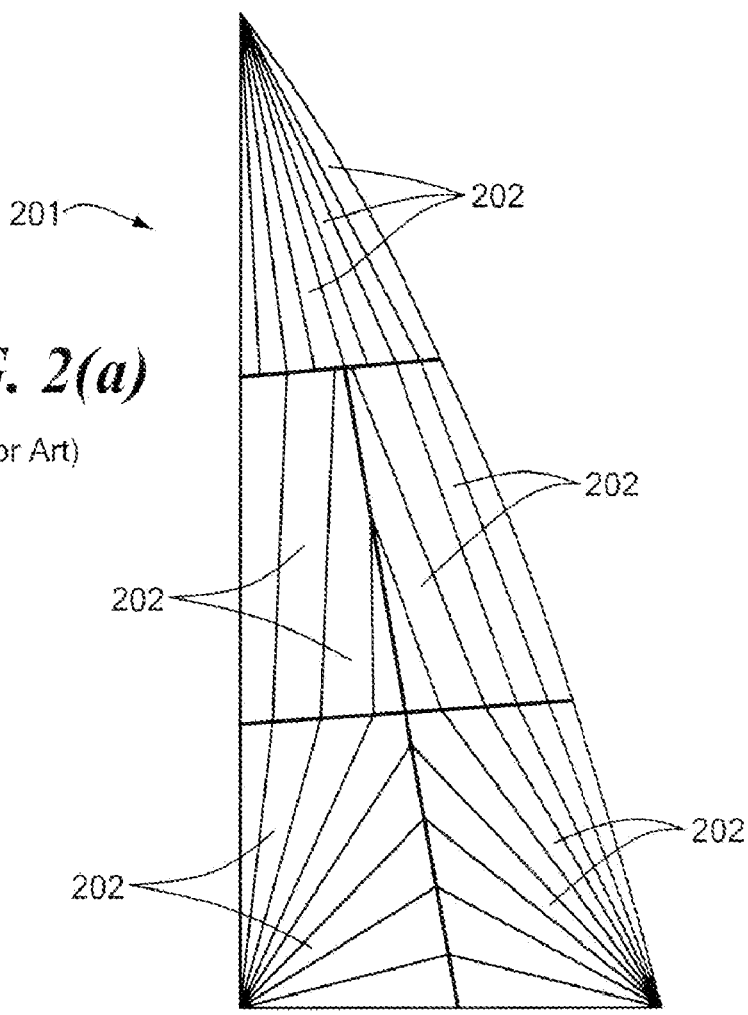
FIG. 2(a) schematically shows a radial cut sail (prior art)
Figure 2B:
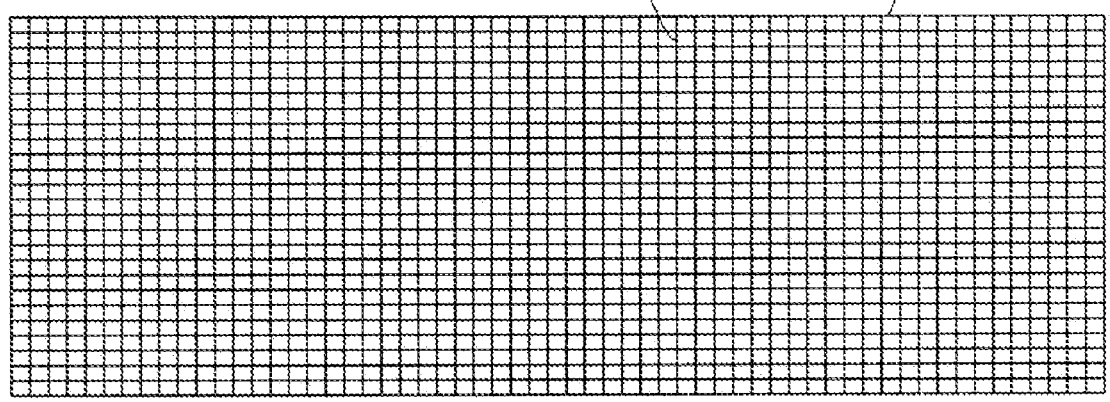
FIG. 2(b) schematically shows the woven layers of fiber within an exemplary panel of the radial cut sail of FIG. 2(a).

Various embodiments of the invention advance warp and fill technology in the area of roll good sailcloth and are intended to provide sailcloth and sails that resist airfoil shape deformation in a manner that is largely comparable to grand prix sails, but which are significantly less expensive to design and manufacture. This technology also provides roll good sailcloth that is largely comparable in weight and durability to the materials used to manufacture grand prix sails. Moreover, this technology can be applied to the latest polyester, nylon, aramid, PEN, PBO, UHMWP, or carbon fabrics. Significantly, embodiments of the present invention minimize (in some cases, eliminate) significant capital investment by sail makers and dispense with expensive radial cutting.

It has now been found that non-woven, laminated roll good sailcloth can be produced with multiple, load bearing fiber layers arrayed in asymmetrical, "off-angle" axes, as well as in or together with conventional warp and fill layout. In making the sail, the roll good sail cloth (which typically is manufactured along a machine axis to a certain length and sold as a roll of cloth) is cut into panels based on desired features and implementation of the design, usually by use of a computer program. Due to the asymmetric pattern of the fibers within the panel, the fibers within the panels of the sail can be generally aligned with expected loads under sailing conditions, without the added weight of having additional, non-load bearing symmetrical fibers.

In illustrative embodiments of the invention, an assembly of multiple fiber layers are arrayed at various angles off a conventional warp (fibers that run the length of the sail cloth) or fill direction (the fill direction is also referred to as the weft, these are fibers that conventionally run across the width of a the sail cloth—perpendicular to the warp) such that the fiber orientation of the roll good cloth is asymmetrical across the machine axis that runs the length of the sail cloth. The multiple fiber layers forming the sailcloth lack mirror image symmetry across the machine axis. Furthermore, the fibers forming the sail, which form a first face and a second face, form a pattern that when viewed from the first face is different from when viewed from the second face. Each fiber layer is arrayed in its own plane so crimp deformation is eliminated. In addition to being non-woven, the layers of fiber may not require any additional knits or strands to hold the various layers of fiber together.

The symmetrically arrayed fiber layers produced in accordance with various embodiments of the invention may be laminated to a film surface to complete the material. The laminate may include materials such as MYLAR polyester film with a uniform adhesive such as ADCOTE 122. Alternative laminate surfaces can be used, such as polyester or taffeta, or other films such as Tedlar. In other embodiments, the layers of fiber may be molded together using a mold material such as a polymer.

As with sand prix sails, the fibers, arrayed in accordance with aspects of the invention, are the primary load bearing structure of the sail. In preferred embodiments of the invention, the sail includes at least three layers of fiber to form a durable, stable sail that can withstand a variable number of loads seen in a particular sailing environment. In contrast to grand prix sails, however, aspects of the invention permit efficient, relatively inexpensive design and construction of roll good sailcloth sails, oriented to expected loads and resistant to airfoil shape deformation.

Figure 3A:
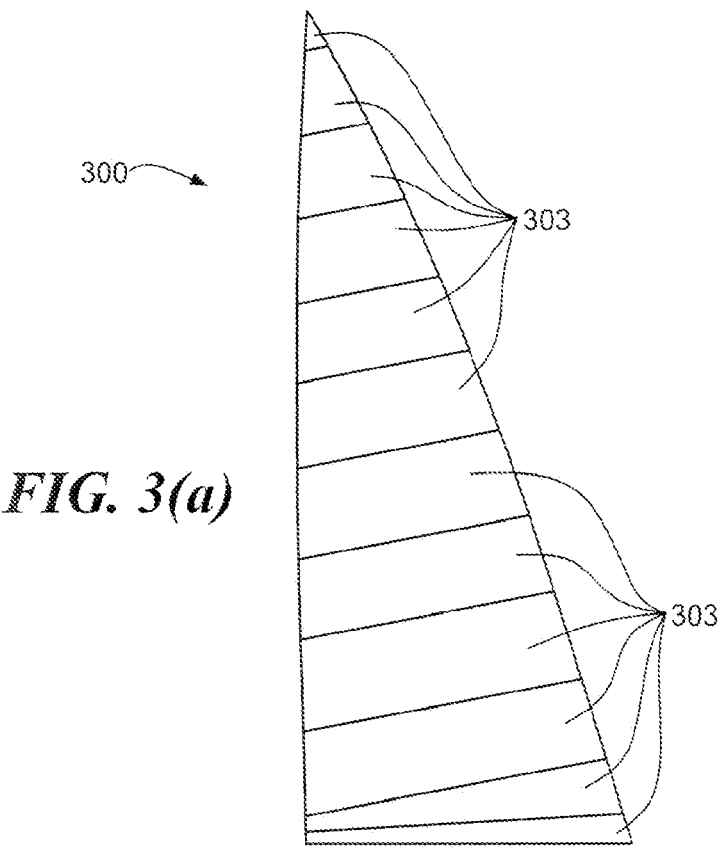
FIG. 3(a) schematically shows an exemplary cross cut panel arrangement for a sail using roll good sailcloth, in accordance with an embodiment of the invention.
Figure 3B:
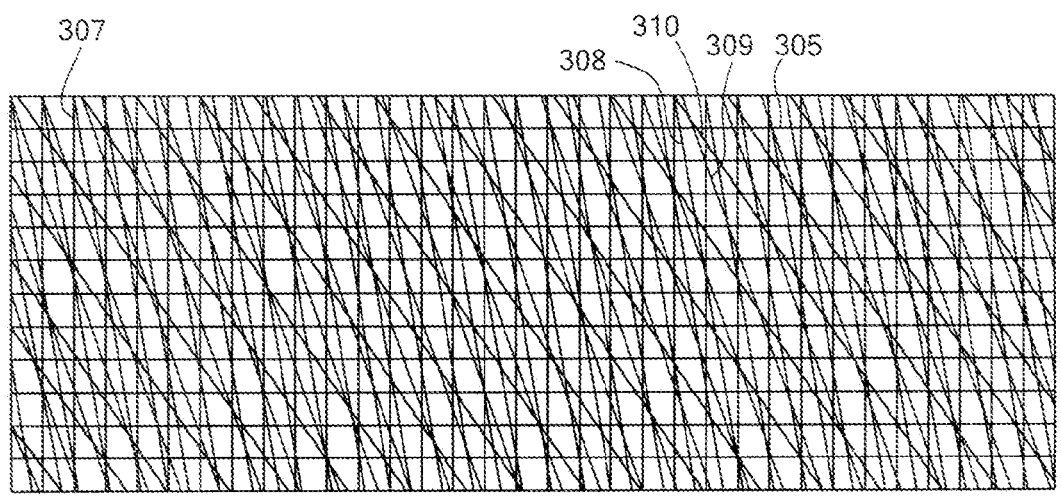
FIG. 3(b) schematically shows the layers of fiber within the roll good sail cloth of FIG. 3(a), in accordance with an embodiment of the invention.

To illustrate these concepts, FIG. 3(a) shows an exemplary cross cut panel arrangement for a mainsail 300 using roll good sailcloth that incorporates the fiber arrays shown in FIG. 3(b), in accordance with an embodiment of the invention. Using the non woven method of various embodiments of the invention, load bearing fiber layers can be laid out in each panel 303 at angles off the conventional warp/fill perpendicular, as illustrated. As shown in FIG. 3(b), the warp fiber 305 and fill fiber 307 may be, for example, arrayed at right angles, while off angle fibers 308, 309, and 310 may be arrayed at various angles from the fill, such as, without limitation, 10 degrees, 20 degrees and 35 degrees from the fill respectively.

Of course, other angles may suffice. Specifically, the angles of the fibers may be varied infinitely to suit the sail maker's purpose. In practice, a pre-defined range of fiber angles should be sufficient for crosscut or vertical cut design and manufacture of most sails. The fibers in each warp, fill, and off-angle fiber layer are arrayed in parallel to the fibers of that layer. In each case also, the denier of the fiber and denier per inch of each layer of fiber can be varied infinitely to suit design and sail use requirements. For example, an ocean passage offshore sail typically has a higher denier and denier per inch than the sail for an inshore racing sailboat. Again, in practice, a defined range of fiber characteristics should be sufficient for a wide variety of sail uses.

As noted above, embodiments of the present invention permit efficient, cost effective design and manufacture of sails using cross cut or vertical cut sail design. For example, a mainsail or headsail 401 having cross cut panels 402 designed to be perpendicular to the mast, as shown in FIG.

Figure 4A:
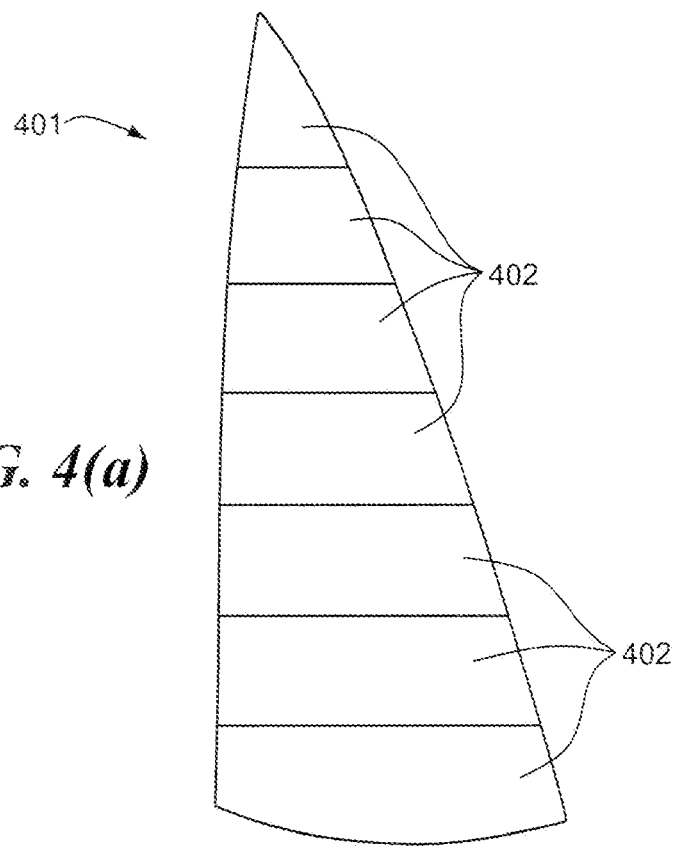
FIG. 4(a) schematically shows an exemplary sail having cross cut panels perpendicular to the mast, in accordance with an embodiment of the invention.
Figure 4B:
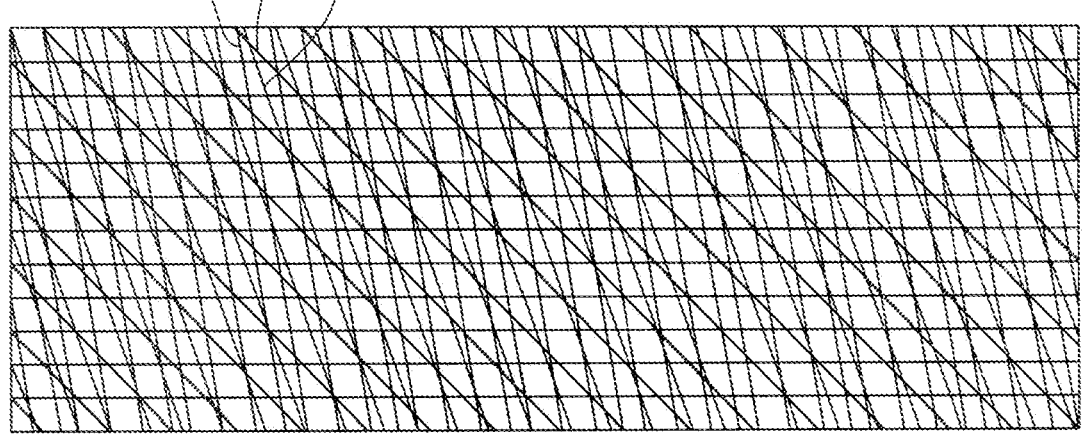
FIG. 4(b) schematically shows in more detail the layers of fiber within the roll good sail cloth of FIG. 4(a), in accordance with an embodiment of the invention.

4(a) may include an asymmetrical fiber array shown in FIG. 4(b). Using the asymmetrical method as noted herein, load bearing fiber layers can be laid out at angles off the conventional warp/fill perpendicular. It is not necessary to rotate panels or to design, cut, and fasten many panels (as required by radical cut designs for conventional roll good sailcloth). Panels can be cut and oriented to the vertical angle of the luff in the case of a mainsail or the vertical angle of the mast in the case of a jib or genoa headsail. The asymmetrical load bearing fiber layers in the sailcloth may be oriented without rotation or special cutting to absorb load on the vertical, at off angles from the vertical, and, of course, at 90 degrees. In various embodiments, load lines on the sail during expected sailing conditions may be predetermined, with each layer of fiber aligned along one of the load lines. Embodiments of the invention may produce sailcloth so that the leech loads are off the angle of conventional fill and aligned to a more acute angle. The thread line layout in FIG. 4(b) may be advantageously designed for this configuration. Instead of fill fibers at 90 degrees to the warp, exemplary fiber layers 406, 407, and 408 are laid at approximately 45, and 80 degrees, respectively, in line with loads out of the clew. This allows for excellent cloth utilization, easy construction, and if required, battens in the seams.

Figure 5A:
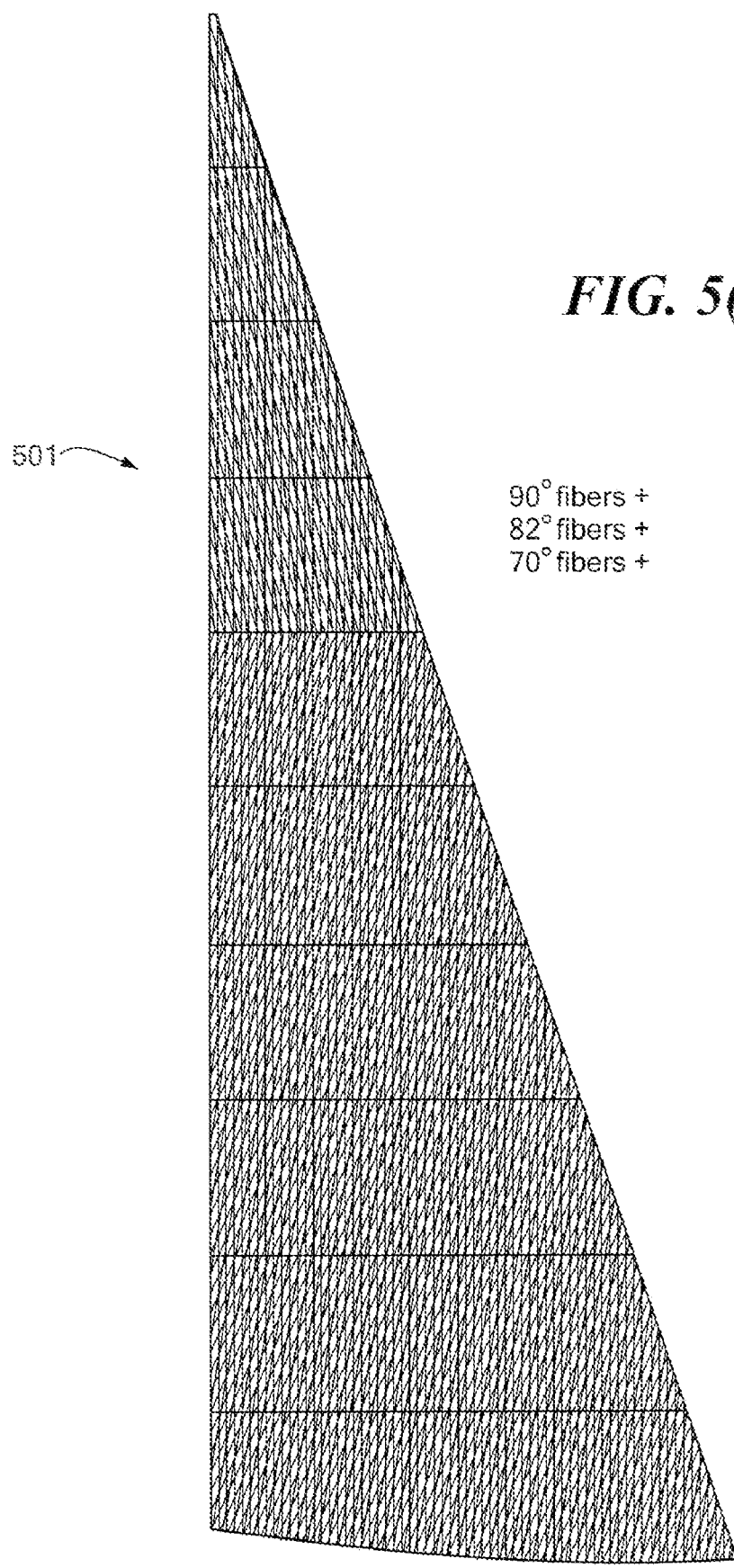
FIG. 5(a) schematically shows an exemplary cross cut panel arrangement for a sail using roll good sailcloth incorporating fiber layers at 70, 82, and 90 degrees from the warp/machine axis, in accordance with an embodiment of the invention.

To illustrate more clearly the various layers of fiber, FIG. 5(a) shows a cross cut sail 501. The cross cut sail 501 includes panels that are formed from a sail cloth with the following layers of fiber: a layer of fiber oriented along the warp/machine axis (not shown); a layer of fiber 502 at 70 degrees to the warp/machine axis as shown in FIG. 5(b); a layer of fiber 504 at 82 degrees to the warp/machine axis as shown in FIG. 5(c); and a layer of fiber 306 at 90 degrees to the machine axis as shown in FIG. 5(d), in accordance with an embodiment of the invention. Each of these fiber layers 502, 504 and 506, and the layer of fiber along the machine axis are overlaid to form the sailcloth.

FIG. 6(a) represents a leech or vertical-cut sail 602 incorporating illustrative embodiments of the invention, where the panels 603 are aligned with the warp parallel to the leech straight line. As shown in FIG. 6(b), the warp fibers 604 and fibers off angle to the warp 605 become the structural members in the sail. FIGS. 6(a-b) illustrate the design flexibility of roll good sailcloth incorporating aspects of the invention. Vertical cut sails may be particularly suited to certain roller furling systems, and vertical cut designs may offer creative load force design options to sail makers relative to both cross cut and radial cut designs.

In accordance with various embodiments of the invention, during manufacturing the warp, fill (if required), and off angle fibers may be, without limitation, laid out on a frame by way of a computer driven fiber laying head. Fiber angles and density are determined by the sailcloth designer and entered into a standard computer aided manufacturing ("CAM") program for the fiber-laying machine. Once laid out on the frame, the fibers are then incorporated within a laminate. For example, the fiber layers may be incorporated between two pieces of film to form a laminate.

FIG. 7 shows a process of making a roll good sail cloth in accordance with an embodiment of the invention. The process begins at step 701, in which three or more layer of fiber are overlaid. As in above-described embodiments, each layer of fiber is formed from a plurality of substantially parallel fibers generally oriented in a direction that is different than the fibers in any other layer. Furthermore, all the layers of fiber that form the sail cloth form, when overlaid, a pattern that is asymmetric along the machine axis.

The process then continues to step 703, in which the multiple layers of fibers are hot-nipped onto a film coated with a heat-sealable adhesive such as Adcote 1217D at a temperature of 300° F. The fibers are thus glued in their desired orientation to the film in what amounts to a first pass lamination step. Thus, no knitting of the fibers is required. This first pass film may be Mylar, a Mylar bonded to polyester taffeta, or any one of several other films.

The fibers and film are then run through a laminator for the final bonding process, in step 705. One or both sides of the cloth may be laminated with one or more layers of film to form the roll good sail cloth.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A sail cloth in roll good form, the sail cloth having a machine axis that runs the length of the sail cloth, the sail cloth comprising:
   at least three layers of fiber, the at least three layers being overlaid, each layer of fiber formed from a plurality of substantially parallel fibers generally oriented in a direction that is different than the fibers in any other layer,
   wherein all the layers of fiber that form the sail cloth form, when overlaid, an asymmetric pattern across the machine axis.

2. The sail cloth according to claim 1, wherein the at least three layers of fiber are non-woven.

3. The sail cloth according to claim 1, wherein all the layers of fiber that form the sail cloth form, when overlaid, a pattern that lacks lack mirror image symmetry across the machine axis.

4. A sail comprising the sail cloth of claim 1.

5. The sail according to claim 4, wherein the sail has predetermined load lines during expected sailing conditions, and wherein each layer of fiber is aligned in a direction along one of the predetermined load lines.

6. A method of making a sail cloth in roll good form, the salt cloth having a machine axis that runs the length of the sail cloth, the method comprising:
   overlaying three or more layers of fiber, each layer of fiber being formed from a plurality of substantially parallel fibers generally oriented in a direction that is different than the fibers in any other layer, wherein all the layers of fiber that form the sail cloth form, when overlaid, a pattern that is asymmetric along the machine axis.

7. The method according to claim 6, wherein all the overlaid layers that form the sail cloth form a pattern that lacks mirror symmetry along the machine axis.

8. The method according to claim 6, wherein the three or more layers of fiber are non-woven.

9. The method according to claim 6, wherein the sail cloth is to be included in a sail, the method further comprising:
   determining load lines on the sail during sailing conditions; and
   aligning each layer of fiber along one of the load lines.

10. The method according to claim 6, further comprising hot-nipping the three or more layers of fiber onto a film coated with a heat-sealable adhesive.

11. The method according to claim 10, wherein the adhesive is Adcote 1217D.

12. The method according to claim 10, further comprising laminating the hot-nipped layers of film.

13. The method of making a non-woven sail cloth in roll good form, the sail cloth having a first face and second face, the method comprising:

overlaying three or more layers of non-woven fiber such that all the layers of fiber that form the sail cloth form, when overlaid, a pattern that when viewed from the first face is different from when viewed from the second face, wherein overlaying the three or more layers of non-woven fiber includes:

arraying a first layer of fiber in parallel in a first direction;

arraying a second layer of fiber in parallel in a second direction different from the first direction; and arraying a third layer of fiber in parallel in a third direction different from the first direction and the second direction.

14. The method according to claim 13, wherein the overlaid layers lack mirror symmetry along the machine axis.

15. The method according to claim 13, further comprising hot-nipping the three or more layers of fiber onto a film coated with a heat-sealable adhesive.

16. The method according to claim 15, wherein the adhesive is Adcote 1217D.

17. The method according to claim 15, further comprising laminating the hot-nipped layers of film.

18. The method according to claim 13, wherein the said cloth is to be included in a sail, the method further comprising:

determining load lines on the sail during sailing conditions; and aligning each layer of fiber along one of the load lines.

19. The product formed by the process of claim 13.

20. The method according to claim 13, further comprising laminating the three or more layers at fiber together.

* * * * *

UNITED STATES PATENT AND TRADEMARK OFFICE
CERTIFICATE OF CORRECTION

PATENT NO. : 7,305,927 B2  Page 1 of 1
APPLICATION NO. : 11/470317
DATED : December 11, 2007
INVENTOR(S) : Duncan Skinner et al.

It is certified that error appears in the above-identified patent and that said Letters Patent is hereby corrected as shown below:

Col. 10, line 9, claim 18
  replace "said"
  with --sail--

Signed and Sealed this

Eighth Day of April, 2008

JON W. DUDAS
*Director of the United States Patent and Trademark Office*